US008303410B2

(12) United States Patent
Chao et al.

(10) Patent No.: US 8,303,410 B2
(45) Date of Patent: Nov. 6, 2012

(54) NAVIGATION SYSTEM HAVING PREFERENCE REGION ADJUSTMENT MECHANISM AND METHOD OF OPERATION THEREOF

(75) Inventors: Yi-Chung Chao, San Jose, CA (US); HaiPing Jin, San Jose, CA (US)

(73) Assignee: Telenav, Inc., Sunnyvale, CA (US)

( * ) Notice: Subject to any disclaimer, the term of this patent is extended or adjusted under 35 U.S.C. 154(b) by 96 days.

(21) Appl. No.: 12/951,016

(22) Filed: Nov. 20, 2010

(65) Prior Publication Data

US 2012/0129598 A1 May 24, 2012

(51) Int. Cl.
*G06F 17/00* (2006.01)
(52) U.S. Cl. ......................................................... 463/31
(58) Field of Classification Search .............. 463/30–34, 463/40, 42; 434/130
See application file for complete search history.

(56) References Cited

U.S. PATENT DOCUMENTS

| | | | | |
|---|---|---|---|---|
| 6,202,023 | B1 | 3/2001 | Hancock et al. | |
| 2004/0110565 | A1 | 6/2004 | Levesque | |
| 2004/0128319 | A1 | 7/2004 | Davis et al. | |
| 2004/0139159 | A1 | 7/2004 | Ricciardi et al. | |
| 2005/0256766 | A1* | 11/2005 | Garcia et al. | 705/14 |
| 2006/0258463 | A1 | 11/2006 | Cugno et al. | |
| 2007/0129012 | A1* | 6/2007 | Snow | 455/26.1 |
| 2007/0190494 | A1 | 8/2007 | Rosenberg | |
| 2007/0191102 | A1 | 8/2007 | Coliz et al. | |
| 2008/0056215 | A1 | 3/2008 | Kopikare et al. | |
| 2008/0281794 | A1* | 11/2008 | Mathur | 707/3 |
| 2010/0042940 | A1 | 2/2010 | Monday et al. | |
| 2010/0214133 | A1 | 8/2010 | Becker | |

OTHER PUBLICATIONS

International Search Report from PCT Application No. PCT/US2011/057829 dated Mar. 8, 2012.

* cited by examiner

*Primary Examiner* — Ronald Laneau
(74) *Attorney, Agent, or Firm* — Ishimaru & Associates LLP; Mikio Ishimaru; Stanley M. Chang

(57) ABSTRACT

A method of operation of a navigation system includes: receiving a game search preference; locating a compliant opponent location conformant to the game search preference; identifying a first preference region encompassing the compliant opponent location; locating a noncompliant opponent location violating the game search preference; and adjusting the first preference region to exclude the noncompliant opponent location for displaying on a device.

17 Claims, 7 Drawing Sheets

NAVIGATION SYSTEM HAVING PREFERENCE REGION ADJUSTMENT MECHANISM AND METHOD OF OPERATION THEREOF

TECHNICAL FIELD

The present invention relates generally to a navigation system, and more particularly to a system for navigation having preference region adjustment mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Numerous technologies have been developed to utilize this new functionality.

As users become more empowered with the growth of mobile location based service devices, new and old paradigms begin to take advantage of this new device space. There are many technological solutions to take advantage of this new device location opportunity. One existing approach is to use location information to provide gaming and navigation services such as a global positioning system (GPS) for a car or on a mobile device such as a cell phone or a personal digital assistant (PDA).

Location based services allow users to create, transfer, store, and/or consume information that affects the "real world". One such use of location-based services is to provide increased convenience in locating desired opponents for games.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information, when available or in service areas.

In response to consumer demand, navigation systems are providing ever-increasing functionality. Current navigations systems lack features that assist users in finding desired games, connecting to local opponents, and giving players a competitive advantage in opponent selection.

Thus, a need still remains for a navigation system having preference region adjustment mechanism providing low cost, improved functionality, and improved reliability. In view of the ever-increasing need to save costs and improve efficiencies, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: receiving a game search preference; locating a compliant opponent location conformant to the game search preference; identifying a first preference region encompassing the compliant opponent location; locating a noncompliant opponent location violating the game search preference; and adjusting the first preference region to exclude the noncompliant opponent location for displaying on a device.

The present invention provides a navigation system, including: a preference module, for receiving a game search preference; a compliant module, coupled to the preference module, for locating a compliant opponent location conformant to the game search preference; a region module, coupled to the compliant module, for identifying a first preference region encompassing the compliant opponent location; a noncompliant module, coupled to the region module, for locating a noncompliant opponent location violating the game search preference; and a modify module, coupled to the noncompliant module, for adjusting the first preference region to exclude the noncompliant opponent location for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
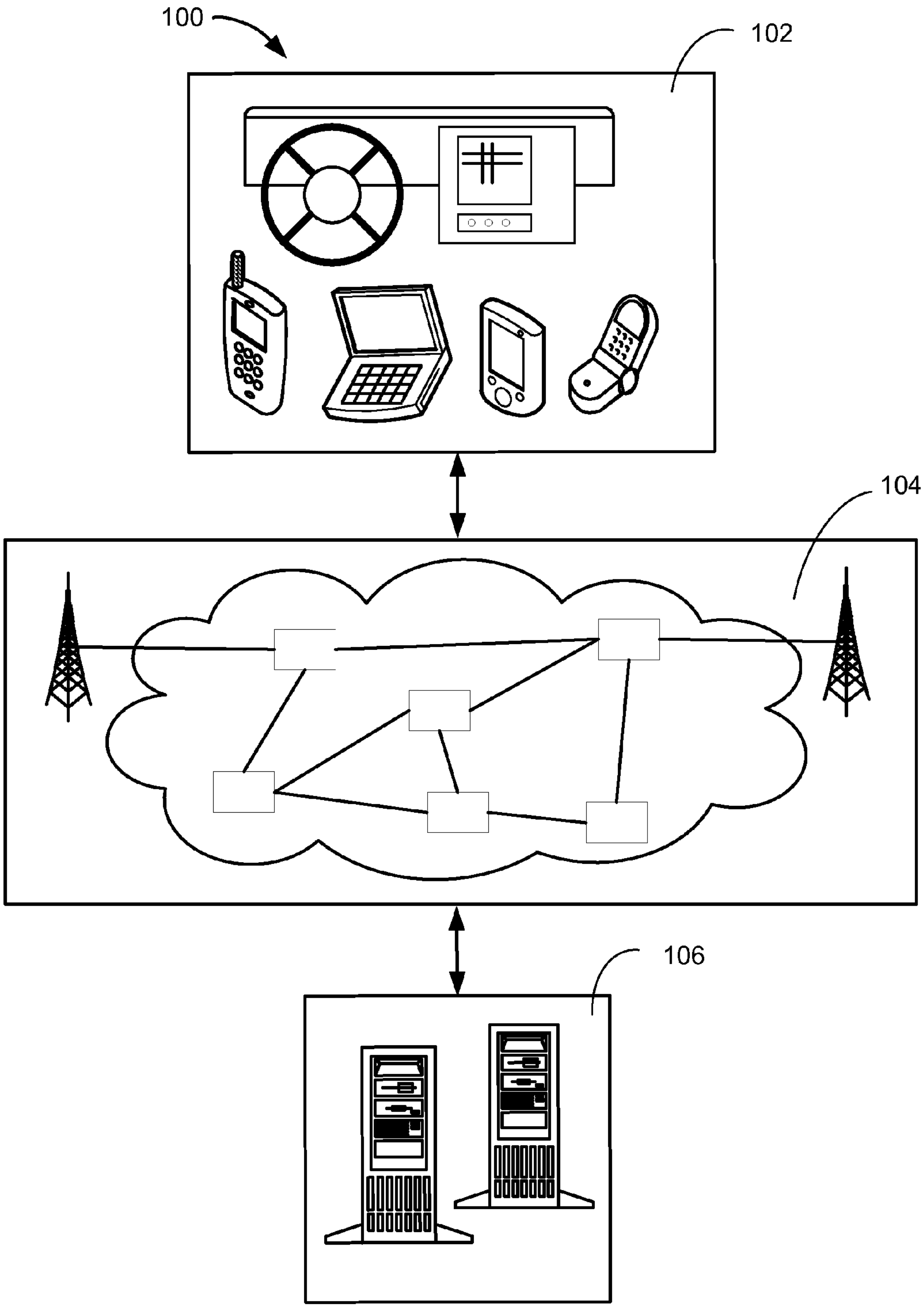
FIG. 1 is a navigation system having preference region adjustment mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "player" referred to herein can include the user or operator of the navigation system. The term "opponent" referred to herein can include people that can join with the player to play games. For clarification in description, the player operates the navigation system to search for opponents to play against. Opponent play against the player and the terms are not used synonymously.

Referring now to FIG. 1, therein is shown a navigation system 100 having preference region adjustment mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telemetric navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple IPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
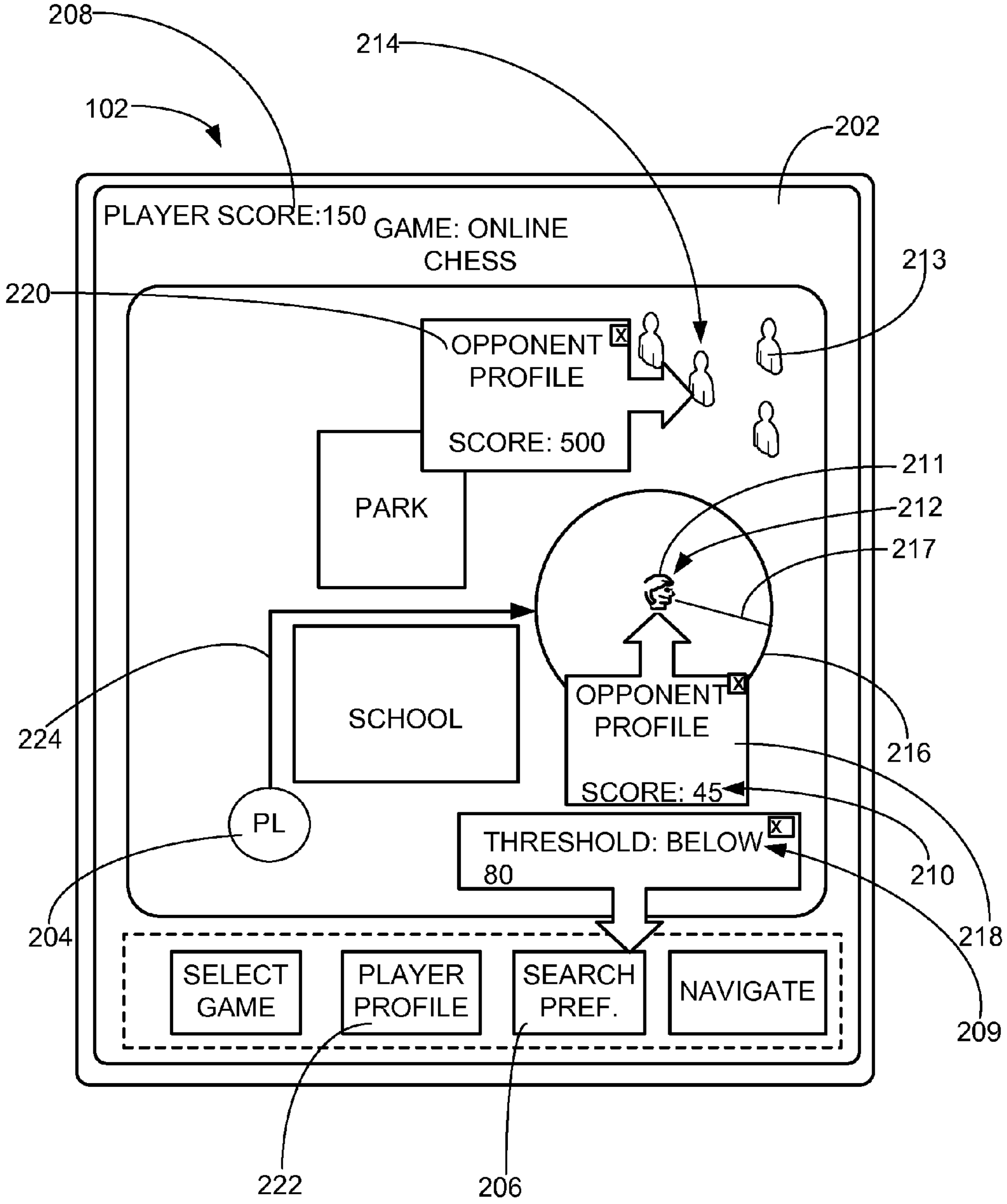
FIG. 2 is a first example of a display interface of the first device.

Referring now to FIG. 2, therein is shown a first example of a display interface 202 of the first device 102. The display interface 202 depicts a geographic region and menus to access games, game information, and navigation information.

The display interface 202 depicts a player location 204, a group of opponents, a school, and a park. The player location 204 is defined as the geographic location of the player operating the navigation system 100. The display interface 202 can depict the player location 204 as a circle on the map of the geographic region.

A game search preference 206 is defined as search criteria for specific opponents or specific game conditions. The player operating the first device 102 can use the game search preference 206 to form games with opponents that meet the player's desired criteria. For example, the game search preference 206 can be entered into the navigation system 100 to find weak opponents or strong opponents. To find weaker opponents, the game search preference 206 can be a criteria for opponents with a lower score than that of the player's. The game search preference 206 can also be used to increase the difficulty of a game by finding stronger opponents based on a higher score than the player's score.

Further, for example, the game search preference 206 can be search criteria for opponents for a specific game, opponent experience level, speed in completing a game or a round in a game, game difficulty, or a combination thereof. For example, the game search preference 206 can be criteria for opponents that complete turns quickly in a game. This option can allow players to find games that are completed faster as the game will not include opponents that have a tendency to delay the game.

The game search preference 206 can be for specific criteria for the different types of game that are played. For example, if the game is virtual poker, the game search preference 206 can be search criteria for opponents that average high bets per betting round. Poker games with opponents that bet high each round can give the player a higher chance of winning more money in a short amount of time. Different examples of the game search preference 206 will be further discussed below.

A player score 208 is defined as the score of the player that is operating the navigation system 100. The player score 208 can be a different value depending on the different type of game played. For example, the player can have a different value for the player score 208 in virtual poker, real-time strategy games, online board games, and multiplayer arcade games. The player score 208 can also be in a rank format. The best player or opponent can be ranked number one as the player score 208. The navigation system 100 can use the player score 208 to compare the player to opponents when searching for opponents.

An opponent score 210 is defined as the score for an opponent. The navigation system 100 can search for opponents with the opponent score 210 below or above a threshold 209. The threshold 209 is defined as a point value that determines if an opponent will be included or excluded. The navigation system 100 can use the game search preference 206 and the threshold 209 to determine which opponents to include and which opponents to exclude. For example, the game search preference 206 can be search criteria for all opponents that have the opponent score 210 below the threshold 209 of one hundred points.

A compliant opponent 211 is defined as an opponent that matches or conforms to the game search preference 206. The compliant opponent 211 can be an opponent that meets the search criteria from the game search preference 206. For example, the compliant opponent 211 can be an opponent with the opponent score 210 below the threshold 209 of one hundred points. The navigation system 100 can access game information and statistics associated with opponents to identity the compliant opponent 211.

A compliant opponent location 212 is defined as the geographic location of the compliant opponent 211. The compliant opponent location 212 can be located by using the communication path 104 of FIG. 1. For example, the compliant opponent location 212 can be located using GPS if the compliant opponent 211 is using a GPS enabled device. The compliant opponent location 212 can also be located using cellular triangulation, radio frequency identification (RFI), or a combination thereof.

A noncompliant opponent 213 is defined as an opponent that does not match or violates the game search preference 206. For example, the noncompliant opponent 213 can be an opponent that does not meets the search criteria from the game search preference 206. For example, the noncompliant opponent 213 can be an opponent with the opponent score 210 above the threshold 209 of one hundred points. The navigation system 100 can access game information and statistics associated with opponents to identity the noncompliant opponent 213.

A noncompliant opponent location 214 is defined as the geographic location of the noncompliant opponent 213. The noncompliant opponent location 214 can be located by using the communication path 104. For example, the noncompliant opponent location 214 can be located using GPS if the noncompliant opponent 213 is using a GPS enabled device. The noncompliant opponent location 214 can also be located using cellular triangulation, radio frequency identification (RFI), or a combination thereof.

A first preference region 216 is defined as a geographic region for the navigation system 100 to communicate with opponents to play games. The first preference region 216 can also be used to identify a region where the player can travel to for joining games with the compliant opponent 211. The first preference region 216 can include a maximum range 217 based on the communication technology used by the game like a Bluetooth™ connection.

The maximum range 217 is defined as the maximum size of the first preference region 216. The maximum range 217 of the first preference region 216 can be determined by the technology used by the game for communicating with opponents to play the game. For example, if the game uses a Bluetooth™ connection to connect the player to the opponent, the maximum range 217 of the first preference region 216 can be thirty feet. The maximum range 217 of the first preference region 216 can also be based on an infrared connection (IR) or a Wide-area network (WAN), as examples.

The first preference region 216 can be modified to include the compliant opponent location 212 and to exclude the noncompliant opponent location 214. The outer boundaries of the first preference region 216 can be adjusted to filter out the noncompliant opponent location 214. The adjustment and modification of the first preference region 216 will be explained in further detail below.

A compliant opponent profile 218 is defined as a record of game statistics for an opponent that conforms to the game search preference 206. The compliant opponent profile 218 can include a record of game statistics, game history, player behavior, and win rates. The navigation system 100 can access the profile of an opponent to determine the compliant opponent profile 218. The opponent's profile information can be stored on local device memory or stored and accessed from a remote database.

A noncompliant opponent profile 220 is defined as a record of game statistics for an opponent that violates the game search preference 206. The noncompliant opponent profile 220 can include a record of game statistics, game history, player behavior, and win rates. The navigation system 100 can access the profile of an opponent to determine the noncompliant opponent profile 220. The opponent's profile information can be stored on local device memory or stored and accessed from a remote database.

A player profile 222 is defined as a record of game statistics for the player operating the first device 102. The navigation system 100 can use the player profile 222 to compare gaming statistics against opponent profiles to determine the compliant opponent profile 218 or the noncompliant opponent profile 220.

A route 224 is defined as a path to a destination or navigation instructions to a destination. The route 224 can be navigation instructions to the first preference region 216. The route 224 can be displayed as arrow directions on a map. The route 224 can also include turn-by-turn navigation instructions to a destination in text, audio commands, or a combination thereof. The display interface 202 depicts the route 224 as a path from the player location 204 to the first preference region 216. The route 224 takes a path between a school and a park to reach the first preference region 216.

Figure 3:
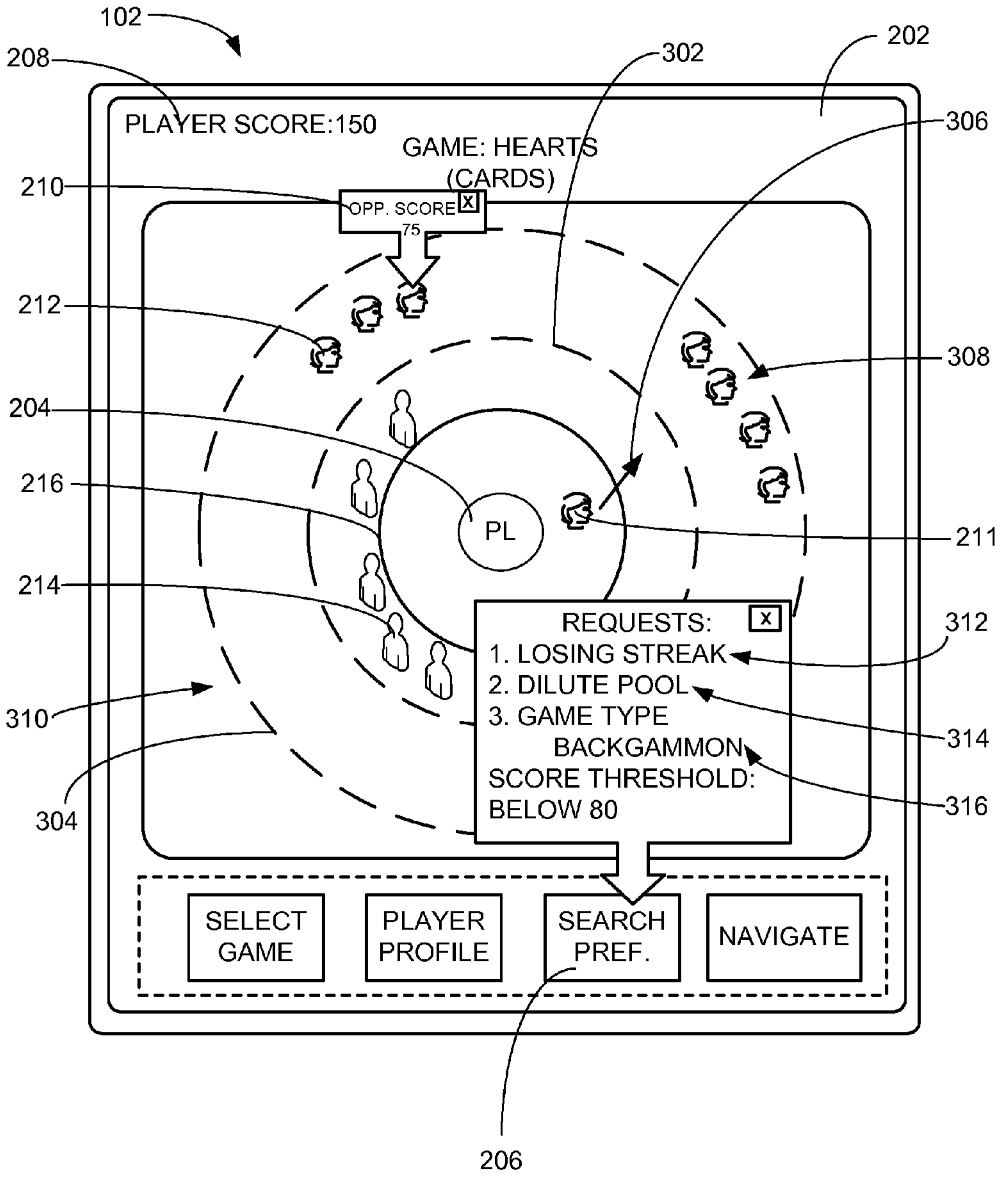
FIG. 3 is a second example of the display interface.

Referring now to FIG. 3, therein is shown a second example of the display interface 202. The display interface 202 can depict the player location 204 at the center of the first preference region 216. The display interface 202 also depicts the first preference region 216 changing in size. In this example, the different sizes of the first preference region 216 are labeled as a second preference region 302 and a third preference region 304.

The second preference region 302 is defined as a geographic region that allows for communication to available opponents to play games. The second preference region 302 can represent the increase in size of the first preference region 216. The third preference region 304 is defined as a geographic region that allows for communication with available opponents to play games. The third preference region 304 can represent the further increase in size of the first preference region 216 beyond the second preference region 302.

For illustrative purposes, the first preference region 216, the second preference region 302, and the third preference region 304 will be used as reference points to describe the functions of the navigation system 100. For example, the navigation system 100 can increase or decrease the first preference region 216. The region labeled the third preference region 304 can be described as decreasing to the area labeled as the first preference region 216.

A migration 306 is defined as a movement of the player location 204, the compliant opponent location 212, the noncompliant opponent location 214, or a combination thereof. For example, if the compliant opponent location 212 moves or changes, the migration 306 has occurred. The display interface 202 depicts the migration 306 of the compliant opponent location 212 out of the first preference region 216.

The navigation system 100 can detect if the player location 204, the compliant opponent location 212, the noncompliant opponent location 214, or a combination thereof moves inside or outside a preference region. For illustrative purposes, the compliant opponent location 212 is depicted as moving to out of the first preference region 216. The navigation system 100 can increase the size of the first preference region 216 to the size of the second preference region 302 to include the compliant opponent location 212 after the migration 306 of the compliant opponent location 212.

A majority 308 is defined as the number larger than half the total of a predetermined population. For example, the display interface 202 depicts the number of the noncompliant opponent location 214 forming the majority 308 over the compliant opponent location 212 in the second preference region 302.

In some group games, the player may need to find a large population of opponents to form a game. The group game may require opponents that violate the game search preference 206 in order to start the game. The navigation system 100 can modify the first preference region 216 to include the majority 308 of the compliant opponent location 212 to minimize the impact of opponents that do not conform to the game search preference 206.

An opponent pool 310 is defined as the total population of opponents that can communication with the navigation system 100 to play a game. The navigation system 100 can analyze the composition of the opponent pool 310 by identifying the locations of the compliant opponent location 212 and the noncompliant opponent location 214 and their respective populations. The locations and the amount of the compliant opponent 211 and the noncompliant opponent 213 of FIG. 2 can determine if the first preference region 216 is increased or decreased to conform to the game search preference 206.

For illustrative purposes, the second preference region 302 is depicted as having a high composition of the noncompliant opponent location 214. The opponents within the second preference region 302 can have a higher value for the opponent score 210 than the player score 208. If restricted to games in the second preference region 302, the player has a higher chance of competing against higher ranked opponents in games.

For example, the navigation system 100 can identify that the opponent pool 310 of the second preference region 302 is of a higher difficulty because more of the opponents in the second preference region 302 have a higher value for the opponent score 210 than the player score 208. Depending on the game search preference 206 and the type of game played, the navigation system 100 can decrease the region to the first preference region 216 to exclude the noncompliant opponent location 214.

If the game search preference 206 requires the opponent pool 310 of more than one opponent, the navigation system 100 can increase the region to the third preference region 304. Increasing to the third preference region 304 can dilute the opponent pool 310 because more of the compliant opponent location 212 is in the third preference region 304. The third preference region 304 will conform closer to the game search preference 206 because the inclusion of the additional numbers of the compliant opponent location 212 forms the majority 308 over the number of the noncompliant opponent location 214.

More examples of the game search preference 206 can include a game streak preference 312, a dilute pool request 314, and an in-person game type 316 as different criteria for opponents and games. The game streak preference 312 is defined as a search criteria for opponents that are on a winning streak or a losing streak. The game streak preference 312 can be assigned the threshold 209 such as three losses in a row or three wins in a row.

The game streak preference 312 can be used to search for opponents that can be prone to winning or losing depending on their current game record. For example, the player can increase the difficulty of playing a game by finding an opponent with a winning streak. The player can decrease the difficulty of the game by finding an opponent on a losing streak.

The dilute pool request 314 is defined as search criteria for diluting the opponent pool 310. The dilute pool request 314 can form a game with less difficulty or more difficulty by increasing the first preference region 216 to include more of the compliant opponent profile 218. For example, the game search preference 206 can be for opponents with a low value for the opponent score 210 and for the dilute pool request 314. The second preference region 302 can contain the majority 308 of the noncompliant opponent location 214 with a high value for the opponent score 210 and the third preference region 304 can contain the majority 308 of the compliant opponent location 212.

The navigation system 100 can receive the dilute pool request 314 to increase the region to the third preference region 304 to dilute the population of the noncompliant opponent location 214. For a more difficult game, the game search preference 206 can include criteria for opponents with a high value for the opponent score 210. The third preference region

304 can provide the player with a more desired group in the opponent pool 310 by including more of the compliant opponent location 212.

The in-person game type 316 is defined as the game search preference 206 for a game that can be played in-person, requiring arm's length distance between participates, or a game without the need of a wireless connection. For example, the player can be at a park with a backgammon board game. The player can use the navigation system 100 to search for an opponent to join in the backgammon game.

Further, for example, the in-person game type 316 can include card games, chess, other board games, and games where the player and the opponent use the same device. The navigation system 100 can locate the compliant opponent location 212 and generate the route 224 of FIG. 2 to the opponent.

The opponent can indicate on their profile if they are available for the in-person game type 316. For example, if the opponent wants to join a four-player card game, the navigation system 100 can detect a signal or indication from the opponent about the opponent's availability for that game. The navigation system 100 can also send a request for the in-person game type 316 that opponents can respond to. The navigation system 100 can navigate the player to the compliant opponent location 212 where the player and opponent can meet together to begin the game.

The navigation system 100 can also decrease the region to conform to the player's criteria. For example, the navigation system 100 can decrease the third preference region 304 to the second preference region 302 to include opponents with a high value for the opponent score 210 than the player score 208.

The adjustment of the first preference region 216, the second preference region 302, and the third preference region 304 can allow the player to filter out undesired opponents or dilute the opponent pool 310. The first preference region 216 can also be decreased to a small size around the player location 204 to ensure that the player has the highest score in the first preference region 216.

Figure 4:
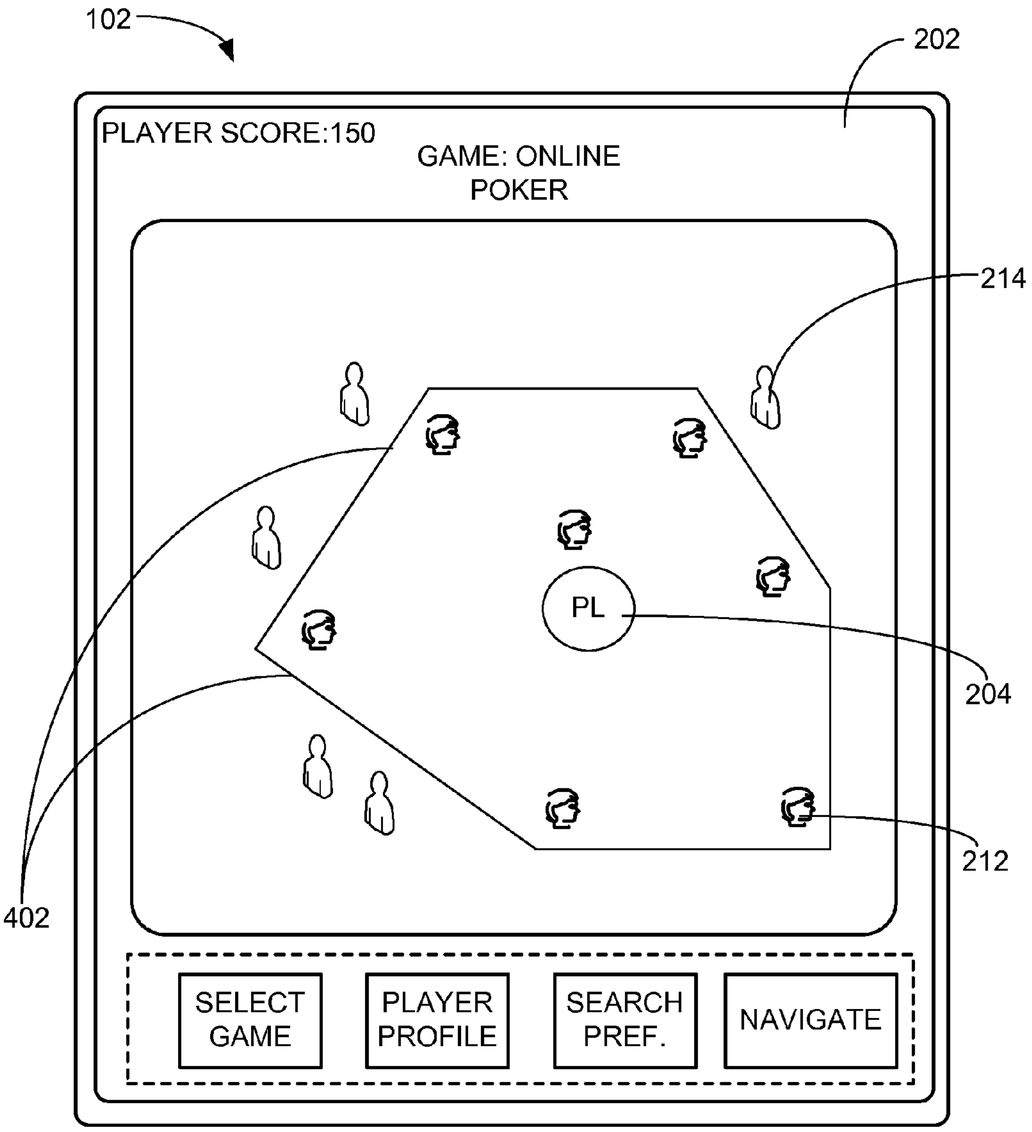
FIG. 4 is a third example of the display interface.

Referring now to FIG. 4, therein is shown a third example of the display interface 202. The display interface 202 depicts the first preference region 216 with six sides. The display interface 202 depicts seven of the compliant opponent location 212 inside the first preference region 216 and five of the noncompliant opponent location 214 outside the first preference region 216.

A boundary 402 is defined as the edges or outer dimensions of the first preference region 216. The navigation system 100 can modify the shape of the first preference region 216 to exclude the noncompliant opponent location 214 and include the compliant opponent location 212. The boundary 402 can be modified to exclude opponents with the noncompliant opponent profile 220. The noncompliant opponent location 214 outside the first preference region 216 can be filtered out from joining in games with the player.

Figure 5:
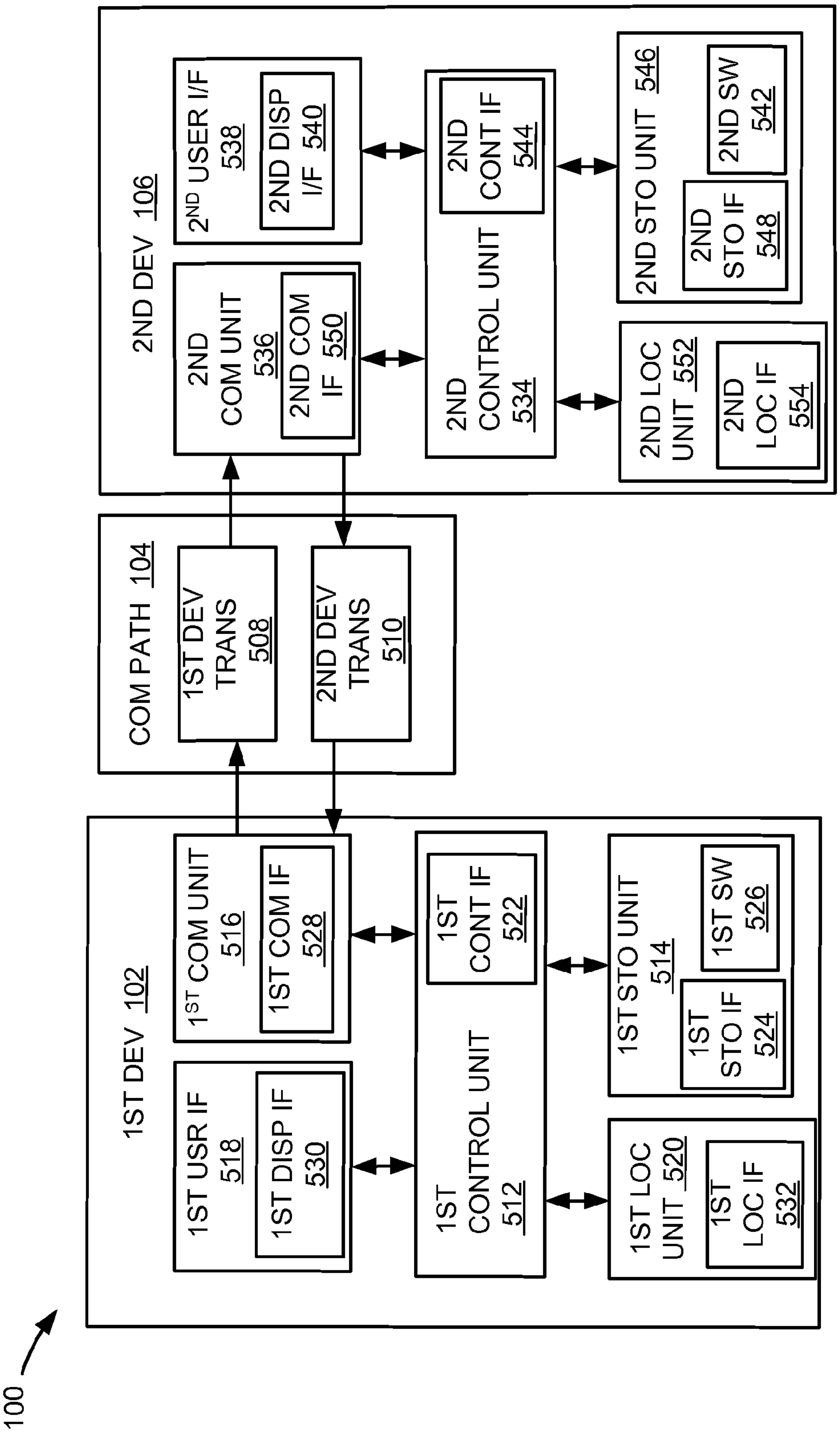
FIG. 5 is an exemplary block diagram of the navigation system.

Referring now to FIG. 5, therein is shown an exemplary block diagram of the navigation system 100. The first device 102 can send information in a first device transmission 508 over the communication path 104 to the second device 106. The second device 106 can send information in a second device transmission 510 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 512, a first storage unit 514, a first communication unit 516, a first user interface 518, and a first location unit 520. The first device 102 of FIG. 5 can be similarly described by the first device 102 of FIG. 1.

The first control unit 512 can include a first control interface 522. The first control unit 512 can execute a first software 526 to provide the intelligence of the navigation system 100. The first control unit 512 can be implemented in a number of different manners. For example, the first control unit 512 can be a processor, an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations external to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The first location unit 520 can generate location information, current heading, and current speed of the first device 102, as examples. The first location unit 520 can be implemented in many ways. For example, the first location unit 520 can function as at least a part of a global positioning system (GPS), an inertial navigation system, a cellular-tower location system, a pressure location system, or any combination thereof.

The first location unit 520 can include a first location interface 532. The first location interface 532 can be used for communication between the first location unit 520 and other functional units in the first device 102. The first location interface 532 can also be used for communication that is external to the first device 102.

The first location interface 532 can receive information from the other functional units or from external sources, or can transmit information to the other functional units or to external destinations. The external sources and the external destinations refer to sources and destinations external to the first device 102.

The first location interface 532 can include different implementations depending on which functional units or external units are being interfaced with the first location unit 520. The first location interface 532 can be implemented with technologies and techniques similar to the implementation of the first control interface 522.

The first storage unit 514 can store the first software 526. The first storage unit 514 can also store the relevant information, such as advertisements, points of interest (POI), navigation routing entries, or any combination thereof.

The first storage unit 514 can be a volatile memory, a nonvolatile memory, an internal memory, an external memory, or a combination thereof. For example, the first storage unit 514 can be a nonvolatile storage such as nonvolatile random access memory (NVRAM), Flash memory, disk storage, or a volatile storage such as static random access memory (SRAM).

The first storage unit 514 can include a first storage interface 524. The first storage interface 524 can be used for communication between the first location unit 520 and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations external to the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106 of FIG. 1, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, or any combination thereof to provide data and communication inputs.

The first user interface 518 can include a first display interface 530. Examples of the first display interface 530 can include the display interface 202 of FIG. 2. The first display interface 530 can include a display, a projector, a video screen, a speaker, or any combination thereof. The screenshot shown on the display interface 202 described in FIG. 2 can represent an example of a screenshot for the navigation system 100.

The first control unit 512 can operate the first user interface 518 to display information generated by the navigation system 100. The first control unit 512 can also execute the first software 526 for the other functions of the navigation system 100, including receiving location information from the first location unit 520. The first control unit 512 can further execute the first software 526 for interaction with the communication path 104 via the first communication unit 516.

The second device 106 can be optimized for implementing the present invention in a multiple device embodiment with the first device 102. The second device 106 can provide the additional or higher performance processing power compared to the first device 102. The second device 106 can include a second control unit 534, a second communication unit 536, a second user interface 538, and a second location unit 552.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the navigation system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the navigation system 100, including operating the second communication unit 536 to communicate with the first device 102 over the communication path 104.

The second control unit 534 can be implemented in a number of different manners. For example, the second control unit 534 can be a processor, an embedded processor, a microprocessor, a hardware control logic, a hardware finite state machine (FSM), a digital signal processor (DSP), or a combination thereof.

The second control unit 534 can include a second controller interface 544. The second controller interface 544 can be used for communication between the second control unit 534 and other functional units in the second device 106. The second controller interface 544 can also be used for communication that is external to the second device 106.

The second controller interface 544 can receive information from the other functional units or from external sources, or can transmit information to the other functional units or to external destinations. The external sources and the external destinations refer to sources and destinations external to the second device 106.

The second controller interface 544 can be implemented in different ways and can include different implementations depending on which functional units or external units are being interfaced with the second controller interface 544. For example, the second controller interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as advertisements, points of interest (POI), navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the navigation system 100 is shown with the second storage unit 546 as a single hierarchy storage system, although it is understood that the navigation system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as nonvolatile random access memory (NVRAM), Flash memory, disk storage, or a volatile storage such as static random access memory (SRAM).

The second storage unit 546 can include a second storage interface 548. The second storage interface 548 can be used for communication between the first location unit 520 and other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations external to the second device 106.

The second storage interface 548 can include different implementations depending on which functional units or external units are being interfaced with the second storage unit 546. The second storage interface 548 can be implemented with technologies and techniques similar to the implementation of the second controller interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second controller interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The navigation system 100 can be executed by the first control unit 512, the second control unit 534, or a combination thereof.

The second location unit 552 can receive location information, current heading, and current speed of the first device 102, as examples. The second location unit 552 can be implemented in many ways. For example, the second location unit 552 can function as at least a part of a global positioning system (GPS), an inertial navigation system, a cellular-tower location system, a pressure location system, or any combination thereof.

The second location unit 552 can include a second location interface 554. The second location interface 554 can be used for communication between the second location unit 552 and other functional units in the first device 102. The second location interface 554 can also be used for communication that is external to the second device 106.

The second location interface 554 can receive information from the other functional units or from external sources, or can transmit information to the other functional units or to external destinations. The external sources and the external destinations refer to sources and destinations external to the second device 106.

The second location interface 554 can include different implementations depending on which functional units or external units are being interfaced with the second location unit 552. The second location interface 554 can be implemented with technologies and techniques similar to the implementation of the second controller interface 544.

For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the first location unit 520, although it is understood that the second device 106 can also operate the first location unit 520.

Figure 6:
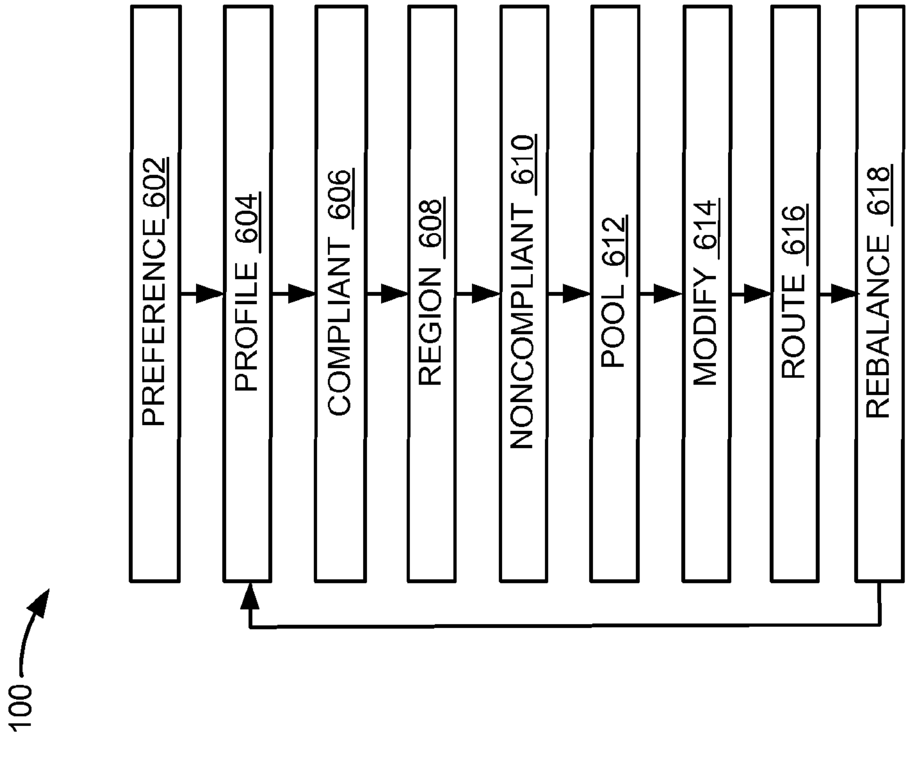
FIG. 6 is a control flow of the navigation system.

Referring now to FIG. 6, therein is shown a control flow of the navigation system 100. The navigation system 100 can include a preference module 602, a profile module 604, a compliant module 606, a region module 608, and a noncompliant module 610. The navigation system 100 can also include a pool module 612, a modify module 614, a route module 616, and a rebalance module 618.

In the navigation system 100, as an example, each module is indicated by a number and successively higher module numbers follow one another. Control flow can pass from one module to the next higher numbered module unless explicitly otherwise indicated.

The preference module 602 receives the search criteria for opponents and games based on criteria that are selected by the player. For example, the preference module 602 can receive the game search preference 206 of FIG. 2. The game search preference 206 can be used as the criteria to find desired opponents for forming games.

For example, the game search preference 206 can be used to find weaker or less experienced opponents to give the player an advantage in a game. The game search preference 206 can be search criteria for opponents with the opponent score 210 of FIG. 2 below the threshold 209 of FIG. 2 of one hundred points. The game search preference 206 can also be search criteria for a more challenging game with opponents that have a high point value for the opponent score 210.

The different types of the game search preference 206 can also be received by the preference module 602. For example, the preference module 602 can also receive the game streak preference 312, the dilute pool request 314, and the in-person game type 316 of FIG. 3. The preference module 602 can send the game search preference 206 to the profile module 604 to search for the criteria in the profiles of opponents.

The profile module 604 identifies the compliant opponent 211 of FIG. 2 and the noncompliant opponent 213 of FIG. 2 from the opponents in the opponent pool 310 of FIG. 3. The profile module 604 searches opponent profiles for gaming information and game statistics based on the criteria from the game search preference 206.

For example, if the profile information conforms to the game search preference 206, then the profile module 604 can identify the profile as the compliant opponent profile 218 of FIG. 2. If the opponent profile violates the game search preference 206, the player profile can identify the profile as the noncompliant opponent profile 220 of FIG. 2. The profile module 604 will be explained in further detail below.

The compliant module 606 locates the geographic locations of opponents that conform to the game search preference 206. The compliant module 606 can locate the compliant opponent location 212 of FIG. 2 by finding the location of an opponent with the compliant opponent profile 218. For example, the compliant opponent location 212 can be located using GPS or cellular triangulation if the compliant opponent 211 is using a device that connects to the communication path 104 of FIG. 1 with these technologies.

The region module 608 identifies a geographic region encompassing the compliant opponent location 212 for the first preference region 216 of FIG. 2 and identifies the maximum range 217 of FIG. 2 of the first preference region 216. For example, the region module 608 can select a location for the center of the first preference region 216 that includes the compliant opponent location 212. The maximum range 217 can be determined by the technology used in linking the player to the opponent. For example, the maximum range 217 can be the thirty feet for a Bluetooth™ connection.

The region module 608 can detect the maximum range 217 using the compliant opponent location 212 as a reference point when the player has to travel to the first preference region 216. The maximum range 217 can also be calculated using the player location 204 of FIG. 2 as the reference point when the player location 204 is the center of the first preference region 216. If the player is the center of the first preference region 216, the maximum size of the first preference region 216 is the maximum range 217 from the player location 204 outward.

The noncompliant module 610 locates the locations of opponents that do not conform to the game search preference 206. For example, the noncompliant module 610 can locate the noncompliant opponent location 214 by locating the geographic location of opponents that do not conform to the game search preference 206 or have the noncompliant opponent profile 220 of FIG. 2. The noncompliant opponent location 214 can be located using GPS or cellular triangulation if the noncompliant opponent 213 is using a device that connects to the communication path 104 of FIG. 1 with these technologies.

The pool module 612 analyzes the composition of the opponent pool 310 from the locations that were located by the compliant module 606 and the noncompliant module 610. The pool module 612 determines the modifications to the first preference region 216 based on the composition of the opponents in the opponent pool 310 and the game search preference 206.

For example, the pool module 612 can identify where the majority 308 of FIG. 3 of the compliant opponent location 212 and the majority 308 of the noncompliant opponent location 214 are clustered in the first preference region 216. The pool module 612 can use the location of the majority 308 of the compliant opponent 211 to determine if the first preference region 216 is increased or decreased to conform to the game search preference 206.

For example, the game search preference 206 can be for a game that is scored on a competitive ladder. The player can use the game search preference 206 to find weaker opponents to maximize the chances of placing high on the ladder. The player can use the game search preference 206 to search for opponents with a low value for the opponent score 210 for placing high on the score ladder.

In this example, the majority 308 of the compliant opponent 211 to the game search preference 206 can be further away from the player than a group of the noncompliant opponent 213. The player can either move to a different location closer to the majority 308 of the compliant opponent 211 or modify the first preference region 216. The pool module 612 can determine the modification to the first preference region 216 to dilute the noncompliant opponent 213. The modification of the first preference region 216 will match the requirements of the game search preference 206.

Further for example, the pool module 612 can identity that the majority 308 of the compliant opponent 211 closer to the player location 204 than the population of the noncompliant opponent 213. The pool module 612 can determine that decreasing the first preference region 216 will conform to the requirements of the game search preference 206.

The modify module 614 adjusts the boundary 402 of FIG. 4 of the first preference region 216 based on the information identified from the pool module 612. The modify module 614 can filter out the noncompliant opponent 213 by increasing or decreasing the first preference region 216. The modify module 614 can also dilute the population of the noncompliant opponent 213 by increasing the boundary 402 of the first preference region 216.

For example, the game search preference 206 can be selected to dilute the opponent pool 310. The modify module 614 can increase the size of the first preference region 216 of FIG. 3 to the second preference region 302 of FIG. 3 to include more of the compliant opponent 211 that are outside the first preference region 216.

If the majority 308 of the compliant opponent location 212 is closer to the player location 204 than the noncompliant opponent location 214, then the modify module 614 can decrease the first preference region 216 to filter out the noncompliant opponent location 214. The modify module 614 can also adjust the shape of the first preference region 216 by modifying the boundary 402 without decreasing the other sides of the first preference region 216.

For example, the modify module 614 can adjust the boundary 402 of the first preference region 216 to cut out the noncompliant opponent location 214 on one side of the first preference region 216. The shape of the first preference region 216 can change based on the noncompliant opponent location 214. The boundary 402 can be drawn in-between the compliant opponent location 212 and the noncompliant opponent location 214 to exclude the noncompliant opponent location 214.

The first preference region 216 cannot be increased beyond the maximum range 217. If the first preference region 216 cannot be modified to conform to the game search preference 206, the player can move to a new location where the first preference region 216 can be modified to conform to the game search preference 206.

The route module 616 generates the route 224 of FIG. 2 to the first preference region 216 or the compliant opponent location 212. If the player needs to change locations for connecting to the compliant opponent 211, the route module 616 can generate the route 224 to the first preference region 216. If the player is searching for the in-person game type 316 of FIG. 3, then the route module 616 can generate the route 224 to the compliant opponent location 212 for the players to start the game.

The route module 616 can also provide instructions for navigating the route 224. The route module 616 can display the route 224 and can provide instructions for navigating to destinations.

The rebalance module 618 detects changes in the first preference region 216 that violate the game search preference 206. For example, the rebalance module 618 can detect the migration 306 of FIG. 3 of the player location 204, the compliant opponent location 212, and the noncompliant opponent location 214 across the first preference region 216. The rebalance module 618 can also detect if the change to the first preference region 216 violates the game search preference 206 and if the first preference region 216 needs to be modified after the migration 306 or change.

For example, the player can be connected to the compliant opponent 211 of FIG. 3 in a one-on-one game. The first preference region 216 can be identified to encompass the compliant opponent location 212 and the player location 204 to exclude any other opponents from the game. The compliant opponent 211 can move out of the first preference region 216 of FIG. 3.

The rebalance module 618 can detect the migration 306 of the compliant opponent 211 and detect that the first preference region 216 needs to be adjusted to conform to the game search preference 206 after the migration 306. The navigation system 100 can identify a larger size for the first preference region 216 to increase the compliant opponent location 212. The navigation system 100 can adjust the boundary 402 of the first preference region 216 to exclude any noncompliant opponent 213 that may have been included when the region was increased to include the compliant opponent location 212.

The navigation system 100 can increase the size of the first preference region 216 to include the compliant opponent 211 up to the maximum range 217. If the compliant opponent 211 moves beyond the maximum range 217, then the navigation system 100 can generate the route 224 to a location where the player can communicate to the compliant opponent 211 for playing a game.

The rebalance module 618 can be coupled to the profile module 604 to readjust the first preference region 216 after the migration 306 of the compliant opponent 211. For example, the profile module 604 can detect other opponents in the opponent pool 310. The profile module 604 can identify the compliant opponent 211 and the noncompliant opponent 213 from the population in the opponent pool 310.

The compliant module 606 can locate the positions of the compliant opponent 211 that were identified by the profile module 604. The region module 608 can identify the first preference region 216 encompassing the compliant opponent location 212 that moved out of the first preference region 216 of FIG. 3.

The noncompliant module 610 can locate the noncompliant opponent location 214 from the noncompliant opponent 213 that were identified by the profile module 604. The pool module 612 can identify the majority 308 of the noncompliant opponent location 214 to be filtered out. The pool module 612 can determine the modifications to the first preference region 216.

The modify module 614 can modify the boundary 402 of FIG. 4 of the first preference region 216 to conform to the game search preference 206. For example, the modify module 614 can adjust the first preference region 216 to filter out the majority 308 of the noncompliant opponent location 214 after a change in the opponent pool 310. The route module 616 can navigate the player to a new location of the first preference region 216 if the first preference region 216 was moved to conform to the game search preference 206.

The rebalance module 618 can also detect a change of the majority 308 of the compliant opponent location 212 in the first preference region 216 to the majority 308 of the noncompliant opponent location 214. For example, during gameplay a population of the noncompliant opponent 213 can move into the first preference region 216 and the migration 306 of the noncompliant opponent 213 can violate the game search preference 206. The rebalance module 618 can detect the change in the population of the opponent pool 310. The rebalance module 618 can also detect changes to game statistics in the player profile 222, and opponent profiles that may affect the game search preference 206.

The physical transformation from adjusting the first preference region 216 and navigating to the first preference region 216 results in movement in the physical world, such as people using the first device 102 of FIG. 1 based on the operation of the navigation system 100. As the movement in the physical world occurs, the movement itself creates additional information that is converted back to the continued operation of the navigation system 100 and to continue the movement in the physical world.

The navigation system 100 can be implemented on the first device 102 of FIG. 5, on the second device 106 of FIG. 5, or partitioned between the first device 102 and the second device 106. The first software 526 of FIG. 5 of the first device 102 can include the navigation system 100. For example, the first software 526 can include the preference module 602, the profile module 604, the compliant module 606, the region module 608, the noncompliant module 610, the pool module 612, the modify module 614, the route module 616, and the rebalance module 618. The first control unit 512 of FIG. 5 can execute the first software 526.

The first control unit 512 can execute the preference module 602, the profile module 604, the compliant module 606, the region module 608, the noncompliant module 610, the pool module 612, the modify module 614, the route module 616, and the rebalance module 618. The first control unit 512 can execute the preference module 602 to receive the game search preference 206. The first control unit 512 can execute the profile module 604 to receive the player score 208 and the opponent score 210.

The first control unit 512 can execute the compliant module 606 to locate the compliant opponent location 212. The first control unit 512 can execute the region module 608 to identify the first preference region 216. The first control unit 512 can execute the noncompliant module 610 to locate the noncompliant opponent location 214. The first control unit 512 can execute the pool module 612 to evaluate the opponent pool 310.

The first control unit 512 can execute the modify module 614 to adjust the boundary 402 of the first preference region 216. The first control unit 512 can execute the route module 616 to generate the route 224 to the first preference region 216. The first control unit 512 can execute the rebalance module 618 to detect the migration 306 and the change to the majority 308 of the compliant opponent location 212 in the first preference region 216. The first user interface 518 of FIG. 5 can be used to input the game search preference 206 into the preference module 602.

The first communication unit 516 of FIG. 5 can be used by the profile module 604 to receive game information from the player profile 222, the compliant opponent profile 218, and the noncompliant opponent profile 220. The route module 616 can use the first communication unit 516 to send and receive navigation information. The profile module 604 and the route module can use the first display interface 530 to display game and navigation information.

In an example for the second device 106 of FIG. 5, the second software 542 of FIG. 5 can include the navigation system 100. For example, the second software 542 can include the preference module 602, the profile module 604, the compliant module 606, the region module 608, the noncompliant module 610, the modify module 614, the route module 616, and the rebalance module 618. The second control unit 534 of FIG. 5 can execute the second software 542.

The second control unit 534 can execute the preference module 602, the profile module 604, the compliant module 606, the region module 608, the noncompliant module 610, the pool module 612, the modify module 614, the route module 616, and the rebalance module 618. The second control unit 534 can execute the preference module 602 to receive the game search preference 206. The second control unit 534 can execute the profile module 604 to receive the player score 208 and the opponent score 210.

The second control unit 534 can execute the compliant module 606 to locate the compliant opponent location 212. The second control unit 534 can execute the region module 608 to identify the first preference region 216. The second control unit 534 can execute the noncompliant module 610 to locate the noncompliant opponent location 214. The second control unit 534 can execute the pool module 612 to evaluate the opponent pool 310.

The second control unit 534 can execute the modify module 614 to adjust the boundary 402 of the first preference region 216. The second control unit 534 can execute the route module 616 to generate the route 224 to the first preference region 216. The second control unit 534 can execute the rebalance module 618 to detect the migration 306 and the change to the majority 308 of the compliant opponent location 212 in the first preference region 216. The second user interface 538 of FIG. 5 can be used to input the game search preference 206 into the preference module 602.

The second communication unit 536 of FIG. 5 can be used by the profile module 604 to receive game information from the player profile 222, the compliant opponent profile 218, and the noncompliant opponent profile 220. The route module 616 can use the second communication unit 536 to send and receive navigation information. The profile module 604 and the route module can use the second display interface 540 to display game and navigation information.

In another example, the navigation system 100 can be partitioned between the first software 526 and the second software 542. For example, the first software 526 can include the preference module 602. The second software 542 can include the profile module 604, the compliant module 606, the region module 608, the noncompliant module 610, the pool module 612, the modify module 614, the route module 616, and the rebalance module 618. The second control unit 534 can execute modules partitioned on the second software 542 and the first control unit 512 can execute modules partitioned on the first software 526.

The second control unit 534 can execute the profile module 604, the compliant module 606, the region module 608, the noncompliant module 610, the pool module 612, the modify module 614, the route module 616, and the rebalance module 618. The second control unit 534 can execute the profile module 604 to receive the player score 208 and the opponent score 210.

The second control unit 534 can execute the compliant module 606 to locate the compliant opponent location 212. The second control unit 534 can execute the region module 608 to identify the first preference region 216. The second control unit 534 can execute the noncompliant module 610 to locate the noncompliant opponent location 214. The second control unit 534 can execute the pool module 612 to evaluate the opponent pool 310.

The second control unit 534 can execute the modify module 614 to adjust the boundary 402 of the first preference region 216. The second control unit 534 can execute the route module 616 to generate the route 224 to the first preference region 216. The second control unit 534 can execute the rebalance module 618 to detect the migration 306 and the change to the majority 308 of the compliant opponent location 212 in the first preference region 216.

The second communication unit 536 of FIG. 5 can be used by the profile module 604 to receive game information from the player profile 222, the compliant opponent profile 218, and the noncompliant opponent profile 220. The route module 616 can use the second communication unit 536 to send and receive navigation information. The profile module 604 and the route module can use the second display interface 540 to display game and navigation information.

The first control unit 512 can execute the preference module 602 to receive the game search preference 206. The first user interface 518 of FIG. 5 can be used to input the game search preference 206 into the preference module 602.

It has been discovered that the present invention provides the navigation system 100 with preference region adjustment mechanism for including the compliant opponent location 212 and excluding the noncompliant opponent location 214 in the first preference region 216 to customize the opponent pool 310. The first preference region 216 allows the filtering of the opponents within the opponent pool 310 for forming games that can give the player an advantage in score, experience, or a combination thereof. The game search preference 206 and the first preference region 216 allow a player to find and navigate to opponents with a specific desired game or criteria thereby customizing the opponent pool 310.

For example, the player of the first device 102 can use the game search preference 206 to search for opponents that conform to criteria determined by the player. The game search preference 206 can include a request for opponents with a lower value of the opponent score 210, the game streak preference 312, the dilute pool request 314, and the in-person game type 316 as options in finding desired games and opponents. The first preference region 216 can be adjusted to exclude the noncompliant opponent location 214 until the player is ranked number one within the first preference region 216.

It has also been discovered that the present invention provides the navigation system 100 that provide a competitive environment. The navigation system 100 can increase or decreased the first preference region 216 based on the conditions set by the game search preference 206 and the composition of the opponent pool 310. For example, the navigation system 100 can dilute the opponent pool 310 by increasing the first preference region 216 to include the majority 308 of the compliant opponent location 212 outside the first preference region 216. If the first preference region 216 is diluted with more of the compliant opponent 211, the player has a higher chance of playing against opponents that conform to the game search preference 206. The player can have a competitive advantage in the game by playing against opponents that conform to criteria selected by the player thereby creating a more competitive environment.

It has further been discovered that the present invention provides the navigation system 100 by adjusting the size of the range to maintain a competitive environment. The navigation system 100 can also detect changes to the first preference region 216 that violate the game search preference 206. For example, the majority 308 of the noncompliant opponent can enter into the first preference region 216. The navigation system 100 can detect the change to the population of the first preference region 216 and rebalance or modify the first preference region 216 to conform to the game search preference 206. The navigation system 100 can keep the preference of opponents inside the first preference region 216 and if the opponent pool 310 changes, the navigation system 100 can adjust the first preference region 216 or navigate the player to a new location to with a different pool of opponents thereby maintaining the competitive environment.

The navigation system 100 describes the module functions or order as an example. The modules can be partitioned differently. For example, the preference module 602, the profile module 604, the compliant module 606, the region module 608, the noncompliant module 610, the pool module 612, the modify module 614, the route module 616, and the rebalance module 618 can be implemented as one module or with lesser number of modules. Each of the modules can operate individually and independently of the other modules.

Figure 7:
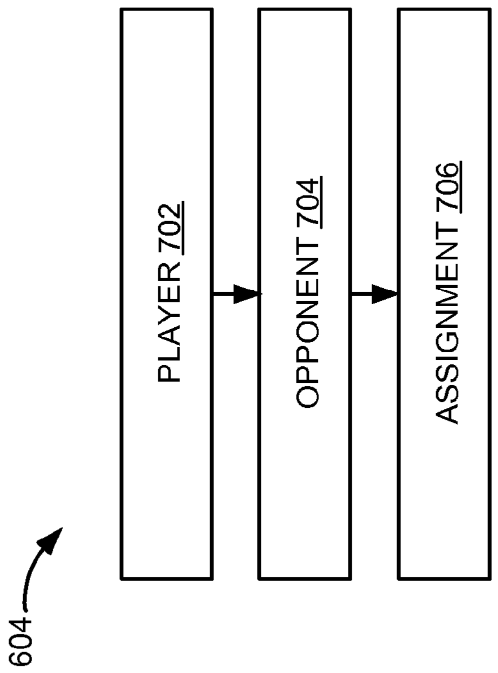
FIG. 7 is a detailed view of the profile module.

Referring now to FIG. 7, therein is shown a detailed view of the profile module 604. The profile module 604 can receive game information from the player profile 222 of FIG. 2 and the profile of opponents to determine if the opponent conforms or violates the game search preference 206 of FIG. 2. The profile module 604 identifies the compliant opponent profile 218 of FIG. 2 and the noncompliant opponent profile of FIG. 2.

The profile module 604 can include a player module 702, an opponent module 704, and an assignment module 706. Control flow can pass from one module to the next higher numbered module unless explicitly otherwise indicated.

The player module 702 receives game information and statistics by accessing the player profile 222. For example, the player module 702 can receive the player score 208 of FIG. 2 from the player profile 222. The player module 702 can also receive information about the game streak preference 312 of FIG. 3 from the player's win record in the player profile 222.

The opponent module 704 receives game information and statistics by accessing the profiles of opponents in the opponent pool 310. For example, the opponent module 704 can receive the opponent score 210 of FIG. 2 from profiles of opponents. The opponent module 704 can also receive information about the in-person game type 316 and the game streak preference 312. For example, the opponent's profile can include information about the opponent's win record and if the opponent is available for an in-person game such as a backgammon board game or card game.

The assignment module 706 identifies the compliant opponent profile 218 or the noncompliant opponent profile 220 based on the information from the opponent module 704. The assignment module 706 detects the opponent's compliance to the game search preference 206. For example, the assignment module 706 can compare the player profile 222 to the profile of opponents to determine the compliant opponent profile 218 and the noncompliant opponent profile 220.

For illustrative purposes, the game search preference 206 can be a criteria for the opponent score 210 that is below the player score 208. The player module 702 can receive the player score 208 as one hundred points for a game. The opponent module 704 can receive the opponent score 210 of ninety points. The assignment module 706 can compare the player score 208 of one hundred points to the opponent score 210 of ninety points to determine the compliant opponent profile 218 or the noncompliant opponent profile 220 for the opponent. Profiles that have the opponent score 210 above the threshold 209 of one hundred points can be identified as the noncompliant opponent profile 220.

The physical transformation from accessing the compliant opponent profile 218 and the noncompliant opponent profile 220 results in movement in the physical world, such as people using the first device 102 of FIG. 1 based on the operation of the navigation system 100. As the movement in the physical world occurs, the movement itself creates additional information that is converted back to the profile module 604 for the continued operation of the navigation system 100 and to continue the movement in the physical world.

The modules of the profile module 604 can be implemented on the first device 102 of FIG. 5, on the second device 106 of FIG. 6, or partitioned between the first device 102 and the second device 106. The first software 526 of FIG. 5 of the first device 102 of FIG. 5 can include the navigation system 100. For example, the first software 526 can include the player module 702, the opponent module 704, and the assignment module 706. The first control unit 512 of FIG. 5 can execute the first software 526.

The first control unit 512 can execute the player module 702, the opponent module 704, and the assignment module 706. The first control unit 512 can execute the player module 702 to receive the player score 208. The first control unit 512 can execute the opponent module 704 to receive the opponent score 210. The first control unit 512 can execute the assignment module 706 to assign the compliant opponent location 212 and the noncompliant opponent location 214. The player module 702 and the opponent module 704 can use the first communication unit 516 of FIG. 5 to receive the player score 208 and the opponent score 210.

In an example for the second device 106 of FIG. 5, the second software 542 of FIG. 5 can include the profile module 604. For example, the second software 542 can include the player module 702, the opponent module 704, and the assignment module 706. The second control unit 534 of FIG. 5 can execute the second software 542.

The second control unit 534 can execute the player module 702, the opponent module 704, and the assignment module 706. The second control unit 534 can execute the player module 702 to receive the player score 208. The second control unit 534 can execute the opponent module 704 to receive the opponent score 210. The second control unit 534 can execute the assignment module 706 to assign the compliant opponent location 212 and the noncompliant opponent location 214. The player module 702 and the opponent module 704 can use the second communication unit 536 of FIG. 5 to receive the player score 208 and the opponent score 210.

In another example, the profile module 604 can be partitioned between the first software 526 and the second software 542. For example, the first software 526 can include the assignment module 706. The second software 542 can include the player module 702 and the opponent module 704. The second control unit 534 can execute modules partitioned on the second software 542 and the first control unit 512 can execute modules partitioned on the first software 526.

The second control unit 534 can execute the player module 702, and the opponent module 704. The second control unit 534 can execute the player module 702 to receive the player score 208. The second control unit 534 can execute the opponent module 704 to receive the opponent score 210. The player module 702 and the opponent module 704 can use the second communication unit 536 of FIG. 5 to receive the player score 208 and the opponent score 210.

The first control unit 512 can execute the assignment module 706. The first control unit 512 can execute the assignment module 706 to assign the compliant opponent location 212 and the noncompliant opponent location 214. The player module 702 and the opponent module 704 can use the first communication unit 516 of FIG. 5 to receive the player score 208 and the opponent score 210.

It has been discovered that the present invention provides the navigation system 100 for providing convenient tools to locate and connect to desired opponents and games. For example, the navigation system 100 can determine the compliant opponent profile 218 and the noncompliant opponent profile 220 by comparing the game search preference 206 to the opponent's game information in the opponent profile.

The navigation system 100 can also search the profiles of opponents for the in-person game type 316 of FIG. 3 to find games that players and opponents mutually share. The navigation system 100 can generate the route 224 of FIG. 2 to the compliant opponent location 212 with the in-person game type 316 so the player and the opponent can meet to start the game.

Thus, it has been discovered that the navigation system 100 of the present invention furnishes important and heretofore unknown and unavailable solutions, capabilities, and functional aspects for a navigation system for monitoring people and objects.

Figure 8:
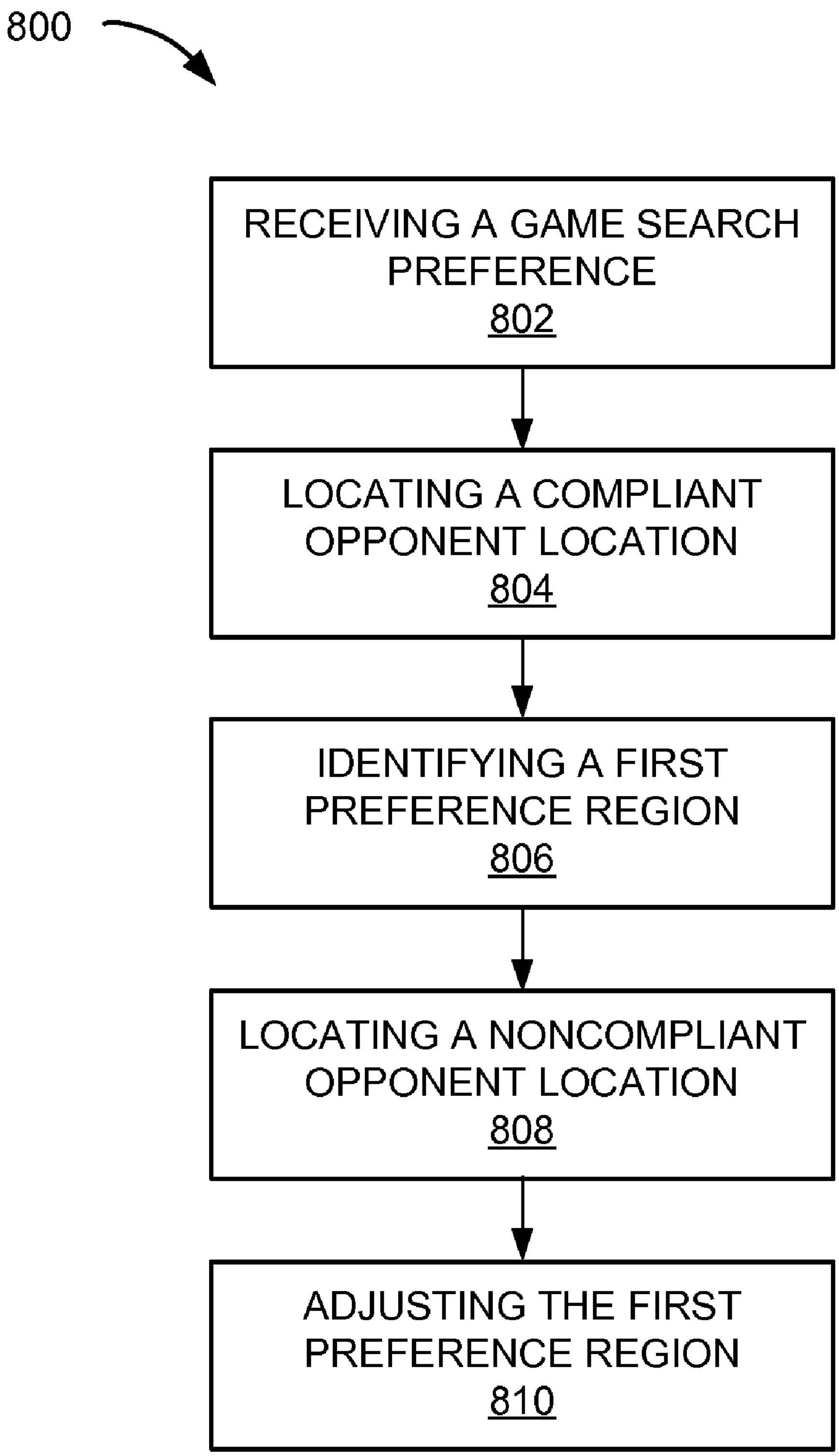
FIG. 8 is a flow chart of a method of operation of the navigation system in a further embodiment of the present invention.

Referring now to FIG. 8, therein is shown a flow chart of a method 800 of operation of the navigation system 100 in a further embodiment of the present invention. The method 800 includes: receiving a game search preference in a block 802; locating a compliant opponent location conformant to the game search preference in a block 804; identifying a first preference region encompassing the compliant opponent location in a block 806; locating a noncompliant opponent location violating the game search preference in a block 808; and adjusting the first preference region to exclude the noncompliant opponent location for displaying on a device in a block 810.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
- receiving a game search preference;
- locating a compliant opponent location conformant to the game search preference;
- identifying a first preference region encompassing the compliant opponent location;
- detecting a migration of the compliant opponent location outside of the first preference region;
- increasing the first preference region to include the compliant opponent location based on the migration;
- locating a noncompliant opponent location violating the game search preference; and
- adjusting the first preference region to exclude the noncompliant opponent location for displaying on a device.

2. The method as claimed in claim 1 further comprising:
- receiving a player score; and wherein locating the noncompliant opponent location includes:
- identifying an opponent score greater than the player score; and
- locating the noncompliant opponent location associated with the opponent score.

3. The method as claimed in claim 1 wherein receiving the game search preference includes:
- receiving a dilute pool request; and further comprising:
- identifying the noncompliant opponent location as closer to a player location than the compliant opponent location;
- locating a majority of the compliant opponent location outside the first preference region; and increasing the first preference region to include the compliant opponent location to dilute the opponent pool with the majority of the compliant opponent location.

4. The method as claimed in claim 1 further comprising modifying a boundary of the first preference region to exclude the noncompliant opponent location.

5. A method of operation of a navigation system comprising:

receiving a game search preference;

locating a compliant opponent location conformant to the game search preference;

identifying a first preference region encompassing the compliant opponent location;

locating a majority of noncompliant opponent locations violating the game search preference;

detecting the majority of the noncompliant opponent locations compared to the compliant opponent location inside the first preference region; and increasing the first preference region to include a majority of compliant opponent locations outside the first preference region; and adjusting a boundary of the first preference region to exclude the majority of the noncompliant opponent locations for displaying on a device.

6. The method as claimed in claim 5 further comprising:

detecting a migration of a noncompliant opponent location to inside the first preference region; and decreasing the first preference region to exclude the noncompliant opponent location based on the migration.

7. The method as claimed in claim 5 wherein:

receiving the game search preference includes receiving an in-person game type; and further comprising:

generating a route to the compliant opponent location with the in-person game type.

8. The method as claimed in claim 5 further comprising generating a route to the first preference region.

9. A navigation system comprising:

a preference module, for receiving a game search preference;

a compliant module, coupled to the preference module, for locating a compliant opponent location conformant to the game search preference;

a region module, coupled to the compliant module, for identifying a first preference region encompassing the compliant opponent location;

a rebalance module, coupled to the region module, for detecting a migration of the compliant opponent location to outside the first preference region;

a noncompliant module, coupled to the region module, for locating a noncompliant opponent location violating the game search preference; and a modify module, coupled to the noncompliant module, for adjusting the first preference region to exclude the noncompliant opponent location and for increasing the first preference region to include the compliant opponent location based on the migration for displaying on a device.

10. The system as claimed in claim 9 further comprising:

a player module, coupled to the preference module, for receiving a player score;

an assignment module, coupled to the player module, for identifying an opponent score greater than the player score; and wherein:

the noncompliant module is for locating the noncompliant opponent location of the opponent score.

11. The system as claimed in claim 9 further comprising:

a pool module, coupled to the noncompliant module, for identifying the noncompliant opponent location as closer to a player location than the compliant opponent location;

a compliant module, coupled to the pool module, for locating a majority of the compliant opponent location; and wherein:

the preference module is for receiving a dilute pool request; and the modify module is for increasing the first preference region to include the compliant opponent location with the majority.

12. The system as claimed in claim 9 wherein the modify module is for modifying a boundary of the first preference region to exclude the noncompliant opponent location.

13. The system as claimed in claim 9 wherein:

the noncompliant module is for locating a majority of noncompliant opponent locations violating the game search preference; and the modify module is for adjusting a boundary of the first preference region to exclude the majority of the noncompliant opponent locations.

14. The system as claimed in claim 13 wherein:

the rebalance module is for detecting the majority of the noncompliant opponent locations compared to the compliant opponent location inside the first preference region; and the modify module is for increasing the first preference region to include the majority of the compliant opponent locations outside the first preference region.

15. The system as claimed in claim 13 wherein:

the rebalance module is for detecting a migration of the noncompliant opponent location to inside the first preference region; and the modify module is for decreasing the first preference region to exclude the noncompliant opponent location.

16. The system as claimed in claim 13 wherein:

the preference module is for receiving an in-person game type; and further comprising:

a route module, coupled to the preference module, for generating a route to the compliant opponent location with the in-person game type.

17. The system as claimed in claim 13 further comprising a route module, coupled to the modify module for generating a route to the first preference region.

* * * * *